(12) United States Patent
Sergeev

(10) Patent No.: US 11,248,161 B2
(45) Date of Patent: Feb. 15, 2022

(54) METHOD OF INCREASING THE OIL RECOVERY FROM AN OIL-BEARING FORMATION

(71) Applicant: LIMITED LIABILITY COMPANY OILMIND [RU/RU], Moscow (RU)

(72) Inventor: Vitalii Vyacheslavovich Sergeev, Moscow (RU)

(73) Assignee: LIMITED LIABILITY COMPANY OILMIND [RU/RU], Moscow (RU)

( * ) Notice: Subject to any disclaimer, the term of this patent is extended or adjusted under 35 U.S.C. 154(b) by 0 days.

(21) Appl. No.: 16/632,403

(22) PCT Filed: Jul. 18, 2018

(86) PCT No.: PCT/RU2018/050080
§ 371 (c)(1),
(2) Date: Jan. 20, 2020

(87) PCT Pub. No.: WO2019/017824
PCT Pub. Date: Jan. 24, 2019

(65) Prior Publication Data
US 2020/0231863 A1    Jul. 23, 2020

(30) Foreign Application Priority Data
Jul. 21, 2017    (RU) .......................... RU2017126170

(51) Int. Cl.
E21B 43/16    (2006.01)
C09K 8/584    (2006.01)

(52) U.S. Cl.
CPC .............. *C09K 8/584* (2013.01); *E21B 43/16* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 5,238,068 A | * | 8/1993 | Fredrickson ............. | C09K 8/62 166/307 |
| 5,797,456 A | * | 8/1998 | Mokadam ................. | C09K 8/52 166/307 |
| 2013/0274155 A1 | * | 10/2013 | Nasr-El-Din ............ | C09K 8/54 507/241 |
| 2016/0017204 A1 | | 1/2016 | Hill et al. | |
| 2017/0152432 A1 | * | 6/2017 | Vo. .......................... | C09K 8/805 |
| 2018/0238160 A1 | * | 8/2018 | Nguyen ................... | C09K 8/80 |

* cited by examiner

*Primary Examiner* — Charles R Nold
(74) *Attorney, Agent, or Firm* — Nath, Goldberg & Meyer; Jerald L. Meyer

(57) ABSTRACT

The present invention relates to a method for increasing oil recovery from an oil-bearing formation including the following successive stages of treating the formation: injecting an invert emulsion in a volume of 3-5 $m^3/m$ of perforated interval thickness followed by squeezing down an acidic composition or a composition containing a nonionic surfactant in a volume of 2-3 $m^3/m$ of perforated interval thickness to the formation, injecting a highly stable direct emulsion containing a colloidal solution of silicon dioxide nanoparticles in a volume of 3-7 $m^3/m$ of perforated interval thickness followed by squeezing down a liquid from a reservoir pressure maintenance system to the formation.

2 Claims, 4 Drawing Sheets

| Structure of invert-emulsion, % vol. | | | Average value of electrical stability, V |
|---|---|---|---|
| Diesel fuel | Emulsifier | Water solution of $CaCl_2$ | |
| 25 | 2 | 73 | 95 |
| 27 | 2 | 71 | 101 |
| 29 | 2.5 | 68.5 | 103 |
| 31 | 2.5 | 66.5 | 108 |
| 33 | 3 | 64 | 110 |
| 35 | 3 | 62 | 106 |
| 38 | 3 | 59 | 92 |
| 40 | 3 | 57 | 81 |
| 42 | 3 | 55 | 74 |

| Structure of invert-emulsion, % vol. | | | Average value of electrical stability, V |
|---|---|---|---|
| Diesel fuel | Emulsifier | Water solution of $CaCl_2$ | |
| 25 | 2 | 73 | 95 |
| 27 | 2 | 71 | 101 |
| 29 | 2.5 | 68.5 | 103 |
| 31 | 2.5 | 66.5 | 108 |
| 33 | 3 | 64 | 110 |
| 35 | 3 | 62 | 106 |
| 38 | 3 | 59 | 92 |
| 40 | 3 | 57 | 81 |
| 42 | 3 | 55 | 74 |

| Structure of highly stable emulsion, % vol. | | | | Average value of electrical stability, V |
|---|---|---|---|---|
| Diesel fuel | Emulsifier | Colloidal silicon dioxide nanoparticles | Water solution of KCl | |
| 10 | 1 | 0.5 | 89.5 | 104 |
| 13 | 1 | 0.7 | 85.3 | 112 |
| 15 | 1.5 | 1 | 83 | 119 |
| 17 | 2 | 1.2 | 79.8 | 125 |
| 20 | 2 | 1.5 | 76.5 | 132 |
| 23 | 2.5 | 2 | 73 | 134 |
| 25 | 2.5 | 2.2 | 71 | 135 |
| 27 | 2.5 | 2.5 | 69 | 138 |
| 30 | 2.5 | 2.5 | 66 | 136 |

| Technical Parameters | Value |
|---|---|
| Tank volume, m³ | 10-20 |
| Activator line length, m | 2 |
| Engine power, kW | 7,5 |
| installed power, kW | 15 |
| inlet pressure, MPa | 7,5 |

Fig. 5

| High-pressure hose parameters | Value | Operational conditions |
|---|---|---|
| Internal diameter, mm | 50 | The temperature of the working fluid from minus 400 °C to plus 1000 °C and at an ambient temperature from minus 500 °C to plus 700 °C |
| Connecting fittings (diameter and thread pitch), mm | 1960 x 2,5 | |
| Nominal working pressure, atm | 0 - 250 | |
| Minimum allowable bend radius and during operation, mm | 630 | |

Fig. 6

| Name of Equipment | Use |
|---|---|
| Acid tank truckSIN-32, SIN-31 | Transportation, preparation and injection of acids |
| Pumping unit CA-320 | Preparation, injection and test on well's capacity |
| Ejectors | Mixing of emulsion components |
| Tanker truck AC-10 | Transportation of chemical reagents |
| Tip-truck | Transportation of chemical reagents |
| Watch car | Transportation of personnel |
| Steam truck (in Winter season) | Steaming work |

Fig. 7

| Number of well | Capacity, $m^3$/day | Perforated interval, m | Volume of bank for 1st stage, $m^3$/well | Volume of bank for 2nd stage, $m^3$/well | Volume of bank for 3rd stage, $m^3$/well |
|---|---|---|---|---|---|
| 1 | 178 | 24 | 72 | 48 | 84 |
| 2 | 254 | 30 | 108 | 75 | 120 |
| 3 | 386 | 52 | 260 | 156 | 312 |
| 4 | 319 | 41 | 176,3 | 90,2 | 229,6 |
| 5 | 180 | 22 | 66 | 44 | 77 |
| 6 | 212 | 24 | 86,4 | 48 | 96 |
| 7 | 377 | 37 | 170,2 | 81,4 | 210,9 |
| 8 | 409 | 31 | 130,2 | 65,1 | 170,5 |
| 9 | 376 | 29 | 116 | 58 | 150,8 |
| 10 | 223 | 34 | 149,6 | 74,8 | 187 |
| 11 | 190 | 33 | 138,6 | 72,6 | 178,2 |
| 12 | 311 | 46 | 216,2 | 138 | 262,2 |
| Total volume of injection by stages: | | | 1689,5 | 951,1 | 2078,2 |

Fig. 8

METHOD OF INCREASING THE OIL RECOVERY FROM AN OIL-BEARING FORMATION

FIELD OF THE INVENTION

The invention relates to the oil-producing industry, in particular to technologies for influencing on oil and gas formation (reservoir) in order to enhance the oil recovery factor.

BACKGROUND

The deterioration of geological and physical conditions for the development of oil and gas fields and the need to maintain oil production at maximum levels lead to the implementation of intensive development systems with the use of reservoir pressure maintenance system by injection water into reservoirs. With an intensive system of producing oil reserves, subsoil users are faced with the problem of breaking the oil displacing agent through more permeable intervals of the reservoir, which leads to a sharp watering of the production wells and a decrease in the economic efficiency of operation of high water-cutted wells.

All oil and gas bearing reservoirs are characterized by varying degrees of change in the parameters of micro- and macroinhomogeneities over the area and volume of the formation. Geological and physical microinhomogeneity of oil and gas bearing formations is the main characteristic of the filtration and capacitance properties of rocks, and macroinhomogeneity is one of the main complicating factors in the application of development systems for oil and gas bearing reservoirs. The natural geological and physical heterogeneity of oil and gas bearing formations leads to an uneven distribution of oil-displacing agents injected into the reservoir. As a result, the main volumes of agents injected into the formation are absorbed by reservoir intervals with the highest filtration and capacitance characteristics.

Implementation of methods for intensifying of oil production leads to increasing the heterogeneity of the filtration-capacitance properties of rocks. One of the ways to intensify oil production, which most significantly affects the reservoir's filtration-capacitance characteristics, is the method of hydraulic fracturing of the formation. Hydraulic fracturing of the formation leads to an increase in the permeability of natural fractures of the formation, and in some cases to the creation of a new system of highly permeable fractures. Thus, in most cases, hydraulic fracturing of the formation results in short-term intensification of oil production and acceleration of oil-and-gas-bearing formation flooding.

The most widely used agent for displacement of oil from oil and gas saturated layers is water. One of the main causes of water breakthrough to producing wells is the difference in mobility of formation fluids and the displacing agent—water that is injected from the surface. Both in surface and in reservoir conditions, water moves towards less resistance, i.e. in the case of a subsurface reservoir, through the intervals with the highest filtration-capacitive characteristics. Thus, water is distributed unevenly along the thicknesses of oil-saturated layers and involves only a small part of the oil-saturated intervals in the filtration processes. Also, water is a liquid with a low oil wash ability, which is explained by its polarity. During filtration of water in oil-saturated intervals of layers only a small part of oil reserves is extracted, because of the different polarity of water and hydrocarbons, the biggest part of the oil reserves remains uninvolved in the form of films that envelop the walls of the filtration channels. Under such conditions, the final oil recovery factor does not exceed 20%.

In this regard, industry experts have developed ways to enhance the oil recovery factor. The main objective of these methods is to influence the oil and gas bearing layers to increase formation coverage and to equalize the front of oil displacement to production wells. The purpose of the methods is to increase the oil recovery factor. The main task of the methods is solved by pumping oil-displacing agent with reduced mobility into the formation.

Reducing the mobility of oil-displacing agents leads to a more even distribution of the agents over the area and volume of the formation. A more even distribution of oil-displacing agents over the area and volume of the formation results in a redistribution of the filtration flows and increased formation coverage by exposing the less filtrable formation intervals to the filtration processes.

At present, the most widely used method for increasing oil recovery is polymer flooding. Experience in the development of oil and gas fields shows that methods of increasing oil recovery based on aqueous solutions of polymers are not effective enough in the presence of high and medium permeable cracks in the seams. The polymer compositions used in the industry are based on alternately injecting into the formation a low-concentration aqueous polymer solution and a crosslinking agent. Considering the fact that, when creating repression on a reservoir, the mobility of polymer solutions based on water does not provide sufficient resistance to movement of this pack in high and medium permeable cracks, the aqueous polymer solution, like water, is completely absorbed by the most permeable intervals of the seams, before entering into reaction with the crosslinker injected immediately after.

The main advantage of using polymer flooding is the presence of viscoelastic properties in a structured polymer pack. The viscoelastic properties of the polymer pack allow controlling water pumped into the formation over large areas, reducing the risk of water breakthrough. The main disadvantages are: low environmental compatibility of polymer compositions, multicomponent and nonselectivity, which leads to irreversible colmatation of filtration channels in natural reservoir system.

In addition, the use of aqueous solutions of polymers and sediment-forming compounds does not allow regulating the wettability of the formation's filtration channels. Wettability of the rock surface (characterized by the marginal angle of selective wetting, the rock may be predominantly hydrophilic or hydrophobic) under reservoir conditions when the liquid moves through narrow capillary channels is one of the main parameters affecting the ability of rocks to filter liquids and gases.

A method for enhanced oil recovery is known from the prior art, including the following successive stages of treatment of formation: injection of a multiple microemulsion based on anionic substances followed by water overflushing, and injection of a multiple microemulsion based on a salt-resisting surfactant or reverse emulsion or direct emulsion (USSR AS No. 1624132, IPC E21B 43/22, published on Jan. 30, 1991). In the known method alkali salts of organic acids (R—COOMe+), i.e., alkali metal salts of organic acids, are used to block water-saturated intervals of the formation. The principle of blocking is based on the formation of sediments due to the precipitation of flaked solid particles of salts. The formation of solid salt particles is an irreversible process and their use in methods for affecting the entire area of the formation leads to irreversible colmatation of the pore channels and the disturbance of the filtration system of the formation fluids, which is a drawback of the known method.

Also, an oil recovery enhancement composition including an anionic surfactant (AS) and a nonionic surfactant (NIS) is known from the state of the technique where it contains, as AS, oil or synthetic sulfonates with an equivalent weight of 330 to 580, and as the surfactant, oxyethylated alkylphenols with a degree of hydroxyethylation of from 8 to 16, and further contains a solvent (Russian patent No. 2065946, IPC E21B 43/22, E21B 33/138, published Aug. 27, 1996). In the known solution, the problem of increasing the stability of the surfactant composition for its application in high-temperature formations with high mineralization of formation waters is solved. The purpose of the composition is to increase the oil displacement by pre-wash of oil with the help of surfactants, and not to equalize the front of displacement of oil. In this regard, the drawback of the composition is the impossibility of blocking highly permeable intervals of the formation and the inability to create an oil-displacing pack, which results in low formation coverage.

Also, the prior art discloses a method for controlling the development and enhancement of oil recovery of heterogeneous reservoirs, consisting in successively alternating pumping of the rims of the isolating composition into the production and/or injection wells, using as a solvent a SFPK with a concentration of 5-20% by weight, as an isolating composition, slurry formulations based on organosilicon compounds or direct and invert-emulsion or others are used (Russian patent for invention No. 2257463, IPC E21B 43/2 2, published on Jul. 27, 2005). In the known solution stages of blocking of highly permeable intervals of a layer are provided due to application of an isolating agent and the subsequent pre-wash film of oil due to injection of aqueous solutions of alkalis and solvent. A disadvantage of the known method is the absence of an oil-displacing agent, which provides an increase in the coefficient of formation coverage and the alignment of the front of displacement of oil by the working fluid.

SUMMARY OF THE INVENTION

To solve the above problems in the oil and gas fields development area, a method is suggested for increasing oil recovery factor, based on the stage-by-stage treatment of the petroleum reservoir with emulsion systems and acidic compositions or oil-washing agents.

The essence of the invention consists in that, according to the first variant, the method of enhanced oil recovery includes the following successive stages of the petroleum reservoir (formation) treatment: injection of an invert-emulsion in a volume of 3-5 $m^3$/m of perforated interval thickness ($m^3$/m), followed by an acid composition 2-3 $m^3$/m, injection of highly stable direct emulsion with a content of silicon dioxide nanoparticles 37 $m^3$/m with followed squeezing down to the formation by liquid from the reservoir pressure maintenance system. In this case, as the invert-emulsion, an emulsion with the following structure can be used, % vol: diesel fuel or oil from the oil preparation and pumping station—25-35, emulsifier—1.5-3, technical water—the rest. As technical water, a solution of calcium chloride or a solution of potassium chloride can be used. For carbonate formations, the hydrochloric acid composition containing, in particular, 30%-hydrochloric acid, acetic acid, diethylene glycol, a corrosion inhibitor and water, is used as the active composition. More specifically, the hydrochloric acid composition can contain, %: 30%-hydrochloric acid—50-63, acetic acid—1-3, diethylene glycol—6-12, corrosion inhibitor—1.5-2, water—the rest. For terrigenous formations, an acid composition containing, in particular, 30% hydrochloric acid, hydrofluoric acid, diethylene glycol, acetic acid, a corrosion inhibitor, water is used. Specifically, the acid composition may contain, % by volume: 30% hydrochloric acid—48-60, hydrofluoric acid—1-4, diethylene glycol—6-12, acetic acid—1-3, corrosion inhibitor—1.5-2, water—the rest. As a direct emulsion, an emulsion with the following structure can be used, % vol: diesel fuel or oil from the oil preparation and pumping station—10-20, emulsifier—1-2.5, colloidal solution of silicon dioxide nanoparticles with a particle size from 9 to 100 nanometers—0.5-1.5, technical water—the rest.

Also, according to the second variant, the method of enhanced oil recovery includes the following successive stages of the formation treatment: injection of a invert-emulsion in a volume 3-5 $m^3$/m with followed squeezing down to formation by a nonionic surfactant, which uses a Neonol BS-1 composite mixture of 2-3 $m^3$/m, injection of a highly stable direct emulsion with a colloidal solution of silicon dioxide nanoparticles in volume 3-7 $m^3$/m with followed squeezing down to the formation by liquid from the reservoir pressure maintenance system. In this case, as the invert-emulsion, an emulsion with the following structure can be used, % vol: diesel fuel or oil from the oil preparation and pumping station—25-35, emulsifier—1.5-3, technical water—the rest. As technical water, a solution of calcium chloride or a solution of potassium chloride can be used. As a direct emulsion, an emulsion with the following structure can be used, % vol: diesel fuel or oil from the oil preparation and pumping station—10-20, emulsifier—1-2.5, colloidal solution of silicon dioxide nanoparticles with a particle size from 9 to 100 nanometers—0.5-1.5, technical water—the rest.

Neonol BS-1 (TU 2483-005-48482528-99) is a composite mixture of nonionic surfactant, polyglycol and water, and is intended for use in intensification of oil production processes to treat bottomhole zones of injection and production wells, and also as an additive to crosslinked polymer compositions, used to equalize the injectivity profile of injection wells and reduce water cut in the treated area.

The technical result of the invention is an enhancement of oil recovery factor and an increase in the efficiency of oil and gas fields development due to the increase in formation coverage with the treatment, wash out (washing) of oil film and equalization of the front of oil displacement.

The invention is illustrated by the following graphic materials.

FIG. 5 shows the technical characteristics of the units for preparation of emulsion systems.

FIG. 6 shows the technical characteristics and operating conditions of high-pressure hoses for implementing the technological process of injection.

FIG. 7 shows an approximate list of equipment for implementing the technological process of injection and its purpose.

FIG. 8 shows the main technological parameters of the wells and the injection volumes.

DETAILED DESCRIPTION OF THE INVENTION

Figures 1, 2:
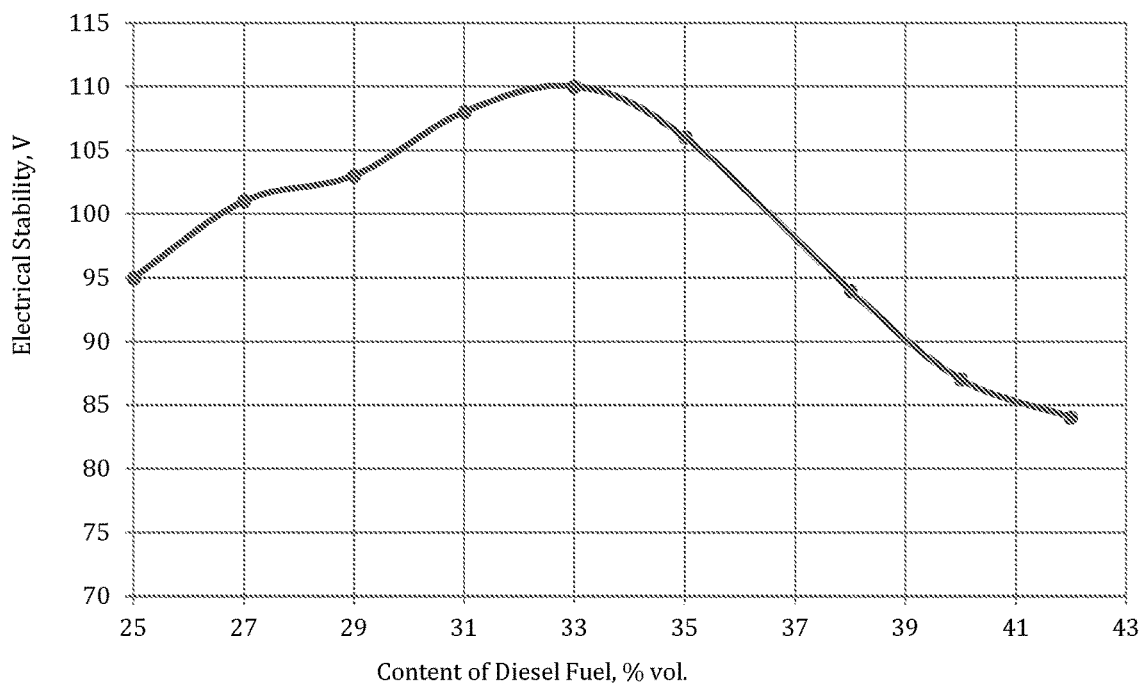
FIG. 1 shows compositions of the invert emulsions and their average values of electrical stability.
FIG. 2 shows a relationship between electrical stability of the invert emulsion and the content of diesel fuel in the invert emulsion.
Figures 3, 4:
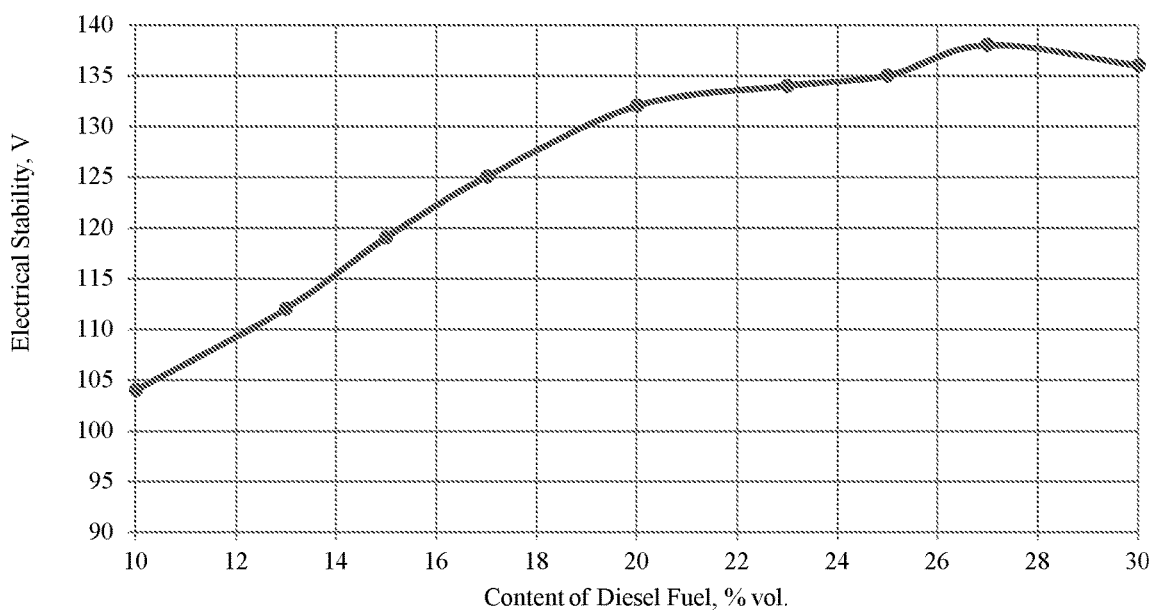
FIG. 3 shows compositions of the highly stable emulsion and their average values of electrical stability.
FIG. 4 shows a relationship between electrical stability of the highly stable emulsion and the content of diesel fuel in highly stable emulsion.

The processes of filtration and displacement of fluids from a porous medium are determined by phenomena occurring both at the interfaces between technological fluids, oil, water, gas, and at the contact of process fluids and fluids with rock. In this regard, the proposed method for increasing oil recovery is based on the physicochemical properties of process fluids injected into oil and gas reservoirs to modify and effectively regulate the surface-molecular properties of reservoir systems.

In order to ensure the most complete coverage of the treated area and volume of the reservoir, the proposed method provides three processing steps with the following objectives:

Stage 1—change of wettability and blocking of the most permeable, water-washed intervals of the reservoir by the invert-emulsion (the "water in oil" type of emulsion).

In general, water-washed intervals of the formation are hydrophilic, which creates additional resistance to the invert-emulsion filtration through the most permeable channels and reduces the risk of absorption of the invert-emulsion by water-washed filtration channels. Also, when the invert-emulsion (dispersion phase is hydrocarbons) is moving along the filtration channels, the contact angle of the rocks is changed.

Stage 2—Squeezing down to formation (overflushing) of the invert-emulsion and increasing the filtration parameters of less permeable intervals by active composition.

The change of the contact angle of the rocks as a result of the invert-emulsion injection at the first stage of treatment leads to an additional resistance for the movement of the active composition on the water basis (acidic compositions or surfactants composition) through these channels so that the active composition will be filtered in less permeable intervals of the formation.

Active compositions allow increasing the filtration parameters of less permeable intervals of reservoir, thus providing a redistribution of fluid flows entering into the bottomhole zone (BHZ). In the case of using acid compositions as an active composition, a partial dissolution of a colmatants and minerals of the formation rock occurs. In the case of the use of surfactant compositions as an active composition, pre-washing of adsorption layers from the walls of the pore channels occurs predominantly.

The presence of adsorption layers promotes intensive deposition of asphalt-resin-paraffin substances in pore channels, which leads to a decrease in the filtration parameters of rocks. The negative effect of sediments on the permeability of rocks is increased in low permeability formations and high content of high-molecular compounds in reservoir oil. The negative effect of deposits on the permeability of rocks is due to the fact that with intensive deposition of asphalt-tar-paraffinic substances on the adsorption layers, the cross section of the pore channels narrows. In some cases, this leads to complete blockage of channels and attenuation of fluid filtration processes in reservoir conditions.

Stage 3—injection of a bank (pack) of a highly stable direct emulsion (the oil-in-water emulsion system) containing the colloidal solution of silicon dioxide nanoparticles with a particle size of 9 to 100 nanometers.

Highly stable direct emulsion is a bank (pack) that holds back the front of oil displacement from the breakthrough of the displacing agent.

When the emulsion system moving in a porous medium, its effective viscosity depends on the volume of water content in the system and the filtration rate of the emulsion, increasing with decreasing filtration rate and under increasing volumetric content of water. This leads to the fact that when moving into the layer that inhomogeneous in the cut, self-regulation of the filtration rate takes place and the leveling of both the injection profile in the BHZ and the front of the displacement of oil is equalized.

The polarity of the highly stable direct emulsion provides: filtration of the emulsion system into predominantly hydrophilic less permeable reservoir intervals; change in the phase permeability of less permeable oil-saturated filtration channels; washing of residual oil as a result of solubilization of the hydrocarbon suspended in the emulsion globules and hydrocarbon film in the oil-saturated filtration channels; a bank (pack) that keeps water from breaking through over filtration channels stimulated by the active composition.

The experience of applying classical invert-emulsion as a blocking agent shows that the boundary stability of the invert-emulsion in the reservoir conditions is in the period 4 . . . 6 months, i.e. highly permeable and washed filtration channels blocked by a stack of the first processing step (bank of invert-emulsion) will be limitedly involved in the displacement process during this time period. This time period will ensure sufficient distance from the BHZ of the bank (pack) of the third stage (highly stable direct emulsion), which forms the front of oil displacement. The front of oil displacement in this period is formed due to the filtration of the displacing agent over the less permeable oil-saturated intervals of the reservoir. During filtration, a certain volume of residual oil displaced from less permeable intervals migrates to more permeable filtration channels that have been active before processing. Therefore, after 4 . . . 6 months gradual entering to the oil displacement process of reservoir intervals that were actively involved in the filtration processes prior to blocking by the invert-emulsion (bank of the first stage of treatment), will increase the coverage of the reservoir by exposure to area and volume.

The difference in the permeability of filtration channels with a common pressure drop in the BHZ leads to a higher filtration rate in intervals with greater permeability and, consequently, the front of the displacing agent (water) movement over more permeable reservoir intervals will catch up with the oil displacement front that was formed due to the movement of a bank of highly stable direct emulsion over less permeable reservoir intervals. These phenomena ensure the alignment of the front of displacement of oil on the way to production wells.

In reservoir conditions, the phenomena occurring at the interface between the reservoir system phases takes place both at the interfaces between oil-water-gas and formation fluids-rock, because of this the capillary phenomena a key factor that make an impact on the processes of fluids filtration in the porous medium. Due to the microinhomogeneity of the porous medium and existence of the micro- and nanosized pore channels in the rock a capillary pressure and wettability of rock are the main parameters which determine the ability of rock to filtrate the liquids. In this circumstances the water moves to the oil-saturated part of layer through biggest pore channels (more permeable channels), and by this the oil is pushed partially into the water-saturated area through larger pores and fractures. As a result, the interface becomes a rugged, fractal species. When oil is displaced from predominantly fractured reservoirs under the influence of pressure drop, water quickly breaks through high permeability channels to producing wells. After this, a slow capillary absorption (impregnation) of water into the oil-saturated parts of the layer make a slight displacement of oil. This contributes to the additional recovery of oil and enhanced oil recovery factor.

In heterogeneous reservoirs at high displacement rates, water does not displace oil from low-permeability areas of the formation under the influence of capillary forces. In connection with this, the oil front remains behind the displacement front. Therefore, oil recovery with an increase in the rate of displacement will decrease both in hydrophobic and in hydrophilic heterogeneous reservoirs. Thus, depending on various combinations of geological and physical conditions of the reservoir system the surface phenomena have a significant effect on the oil recovery factor.

The main characteristic of the process of displacement of oil from a porous medium is the degree of displacement, which directly determines the oil recovery factor. The completeness of displacement is determined by the hydrodynamic factors, the properties of the fluids, and the geological and physical properties of the reservoir system. The degree of displacement is characterized by the stability of the front of displacement of one liquid by another and the residual saturation of the rocks by the displaced liquid behind the displacement front. The residual saturation behind the displacement front is determined by the phase permeability and corresponds to the value at which the phase loses mobility. This value can be regulated by changing the wettability of rocks by a displacing liquid due to the addition of surfactants.

To determine the stability of the invert-emulsion and the direct emulsion modified by nanoparticles, comparative experiments were conducted to measure the aggregative stability of emulsions. The aggregative stability is the ability of emulsions to maintain the degree of dispersity of the internal phase.

The evaluation was carried out according to the index of electrical stability—the values of the electric voltage corresponding to the moment of destruction of the emulsion enclosed between the electrodes of the measuring cell of the device.

The experiments were performed on a FANN device at room temperature (20° C.). The density of the dispersion phase (aqueous solution of potassium chloride) of the direct emulsion is 1120 $kg/m^3$.

As a result of the comparative experiments it was determined that the presence of a colloidal solution of silicon dioxide nanoparticles in the emulsion increases the thermal stability of the emulsion. The optimal concentration of the colloidal solution of silicon dioxide nanoparticles in the emulsion is in the range 0.5-1.5% vol. The results of the experiments are shown in FIG. 1, 2, 3, 4.

The required equipment for carrying out technological operations by the proposed method are presented below.

The enhanced oil recovery method is based on the sequential injection of emulsion systems and active compositions through the injection wells or cluster pumping station (CPS) into the reservoir, each of which performs a specific task in the context of the overall goal of achieving the most selective blocking and stimulating effects in different intervals of the reservoir.

Preparation of emulsion systems is recommended to be performed on blade mixers at a shaft rotation speed of 70-100 rpm or on colloid mills of the mixing unit (if it is available in the field). It is allowed to use the chemical reagent preparation unit with the metering pump and storage tank "USID" complete with the SIN-44.02 pressure-power pump unit. The technical characteristics of the units are shown in FIG. 5.

Mixing unit "USID" allows preparing solutions from liquid chemicals (up to 5 types of chemicals) and powdered chemicals. Depending on the technology, dosing of chemical reagents through the ejector into the main tank, mixing and feeding into the pump unit, which is tied up by the intake of the metering pump with the capacity intended for this type of reagent. The mixing unit consists of: a flowmeter, an ejector with a funnel (for chemical reagent input), an activator, a capacitance, electric motors, shafts with screws, a level gauge, an electrical control unit, a sampler and a manometer.

When implementing the technological process of injection, standard equipment and equipment used in the major overhaul of wells are used. In particular, high-pressure rubber sleeves with metal braid and end fitting, intended for hydraulic systems of various machines and equipment. FIG. 6 shows the technical characteristics and operating conditions of high-pressure hoses. FIG. 7 shows an approximate list of equipment and its purpose. The number of units of equipment and special equipment may differ depending on the volume of injected formulations.

The technical condition of the equipment should provide the ability to control technological processes. At the control points, serviceable samplers must be inserted. The distance between the screw of the agent dispenser and the receiving funnel of the ejector should allow placing under and filling in the container corresponding to the agent's minute flow.

It should be noted that the discharge lines are provided by a non-return valve, bleed valve. The water supply line is provided by a reducing valve. The ejection device must be serviceable, cleaned and inspected after each operation, and equipped with a rubber hose.

The injection of emulsion systems and active composition into the formation can be carried out in one of two ways:
through the injection well;
through the cluster pumping station.

When the blocking banks (packs) are injected through an injection well, an acidic composition is used as the active composition. In this case, the treatment is carried out individually for each individual well by means of technological connection of the lines (high pressure hoses) of the pump units to the wellhead reinforcement of the injection well.

Namely, in order to carry out the method according to the first embodiment, the invert-emulsion of 3-5 $m^3/m$ is injected with subsequent squeezing down to the formation by acidic composition of 2-3 $m^3/m$, followed by injection of a highly stable direct emulsion containing colloidal solution of silicon dioxide nanoparticles of 3-7 $m^3/m$ with subsequent squeezing down to the formation by liquid of reservoir pressure maintenance system. In this case, as the invert-emulsion, a composition with the following structure can be used, % vol: diesel fuel or treated oil from the oil preparation and pumping station—25-35, emulsifier—1.5-3, technical water—the rest. As technical water, a solution of calcium chloride or a solution of potassium chloride can be used. For carbonate formations, the hydrochloric acid composition containing, in particular, 30% hydrochloric acid, acetic acid, diethylene glycol, a corrosion inhibitor and water, is used as the active composition. More specifically, the hydrochloric acid composition can contain, %: 30% hydrochloric acid—50-63, acetic acid—1-3, diethylene glycol—6-12, corrosion inhibitor—1.5-2, water—the rest. For terrigenous formations, an acid composition containing, in particular, 30% hydrochloric acid, hydrofluoric acid, diethylene glycol, acetic acid, a corrosion inhibitor, water is used. Specifically, the acid composition may contain, % by volume: 30% hydrochloric acid—4860, hydrofluoric acid—1-4, diethylene glycol—6-12, acetic acid—1-3, corrosion inhibitor—1.5-2, water—the rest. As a direct-emulsion, a composition with the following structure can be used, % vol: diesel fuel or treated oil from the oil preparation and pumping station—10-20, emulsifier—1-2.5, colloidal solution of silicon dioxide nanoparticles with a particle size from 9 to 100 nanometers—0.5-1.5, technical water—the rest.

When the blocking and active banks (packs) are injected through the CPS, a surfactant composition is used as the active composition. In this case, a group of wells that are connected to the CPS line are processed. The use of acidic compositions when injecting the packs through CPS is prohibited because of the low protection of the CPS lines from the corrosive aggressiveness of acid compositions.

Namely, in order to carry out the method according to the second embodiment, the invert-emulsion of 3-5 $m^3/m$ volume is injected with subsequent squeezing down to the formation by nonionic surfactant, which uses a Neonol BS-1 compositional mixture of 23 $m^3/m$, followed by injection of a highly stable direct emulsion containing colloidal solution of silicon dioxide nanoparticles of 3-7 $m^3/m$ with subsequent squeezing down to the formation by liquid of reservoir pressure maintenance system.

as the invert-emulsion, a composition with the following structure can be used, % vol: diesel fuel or treated oil from the oil preparation and pumping station—25-35, emulsifier—1.5-3, technical water—the rest. As technical water, a solution of calcium chloride or a solution of potassium chloride can be used. As a direct-emulsion, a composition with the following structure can be used, % vol: diesel fuel or prepared oil from the oil preparation and pumping station—10-20, emulsifier—1-2.5, colloidal solution of silicon dioxide nanoparticles with a particle size from 9 to 100 nanometers—0.5-1.5, technical water—the rest.

To select the wells and determine the technological parameters of the process of emulsion systems injection, the following field-research works is carried out:
analysis of geological and production data for wells and determination of the character of water-cutting of wells;
sampling of the liquid to determine the water cut of the produced products and the type of water entering the well;
identification of reacting production wells to assess the effectiveness of the technology; investigation of the tightness of the production string;
assessment of the state of the cement ring in the interval of reservoirs;
determination of the injectivity (capacity) of the well and the profile of the injectivity of the perforated thickness of the formation;
the investigation of pressure recovery curves and indicator curves.

The specific amount of research is determined for each well by an individual work plan.

The following are examples of implementing the method of the first and second embodiments.

Example 1

Treatment of an injection well in carbonate formation. The injectivity (capacity) before treatment is 267 $m^3$/day. The thickness of the perforated interval to be treated is 20 m. An arrangement and binding of the equipment according to the typical scheme were made. The injection of working fluids was carried out in three succeeding stages. The etching time did not provide.

At the first stage, the invert-emulsion of the following composition was injected, % vol.: diesel fuel—25%, emulsifier Sinol-EM (technical data sheet 2413-048-48482528-98)—1.5%, an aqueous solution of potassium chloride with a concentration of 20 $kg/m^3$—73.5 in vol. of 3.6 $m^3/m$. At the second stage, the acidic (hydrochloric acid) composition was injected, % vol.: 30% hydrochloric acid—57, diethylene glycol—8, acetic acid—1.5, corrosion inhibitor Sinol IKK (technical data sheet 2484-002-48482528-98)—1.5, water with a density of 1000 $kg/m^3$—32 in vol. of 3 $m^3/m$. At the third stage, a highly stable direct emulsion with the content of colloidal solution of silicon dioxide nanoparticles was injected, % vol.: diesel fuel—10, emulsifier Sinol-EM (technical data sheet 2413-048-48482528-98)—1, colloidal solution of silicon dioxide nanoparticles—31% vol., propylene glycol monomethyl ether—68.7% vol., water—0.3% vol.)—0.5, technical water with a concentration of potassium chloride 20 $kg/m^3$—88.5, in the vol. of 4.2 $m^3/m$ with subsequent squeezing down to the formation by liquid of reservoir pressure maintenance system.

After 8 months, the efficiency of the treatment was evaluated. Additional oil production from the reacting production wells amounted to 1.2 thousand tons per well. At the time of assessment, the effect continued.

Example 2

Treatment of an injection well in carbonate formation. The injectivity (capacity) before treatment is 310 $m^3$/day. The thickness of the perforated interval to be treated is 38 m. An arrangement and binding of the equipment according to the typical scheme were made. The injection of working fluids was carried out in three succeeding stages. The etching time did not provide.

At the first stage, the invert-emulsion of the following composition was injected, % vol.: diesel fuel—27, emulsifier Sinol-EM (technical data sheet 2413-048-48482528-98)—1.5, an aqueous solution of potassium chloride with a concentration of 25 $kg/m^3$—71.5 in vol. of 4.3 $m^3/m$. At the second stage, the acidic (hydrochloric acid) composition was injected, % vol.: 30%-hydrochloric acid—57, diethylene glycol—8, acetic acid—1.5, corrosion inhibitor Sinol IKK (technical data sheet 2484-002-48482528-98)—1.5, water with a density of 1000 $kg/m^3$—32 in vol. of 2.5 $m^3/m$. At the third stage, a highly stable direct emulsion with the content of colloidal solution of silicon dioxide nanoparticles was injected, % vol.: diesel fuel—15, emulsifier Sinol-EM (technical data sheet 2413-048-48482528-98)—1.5, colloidal solution of silicon dioxide nanoparticles (silicon dioxide—31% vol., propylene glycol monomethyl ether—68.7% vol., water—0.3% vol.)—1.5, technical water with a concentration of potassium chloride 25 $kg/m^3$—82, in the vol. 5.2 $m^3/m$ with subsequent squeezing down to the formation by liquid of reservoir pressure maintenance system.

After 8 months, the efficiency of the treatment was evaluated. Additional oil production from the reacting production wells amounted to 1.43 thousand tons per well. At the time of assessment, the effect continued.

Example 3

Treatment of an injection well in carbonate formation. The injectivity (capacity) before treatment is 169 $m^3$/day. The thickness of the perforated interval to be treated is 18 m.

An arrangement and binding of the equipment according to the typical scheme were made. The injection of working fluids was carried out in three succeeding stages. The etching time did not provide.

At the first stage, the invert-emulsion of the following composition was injected, % vol.: diesel fuel—30, emulsifier Sinol EMI (technical data sheet 2484-007-52412574-01)—2, an aqueous solution of calcium chloride with a concentration of 30 kg/m$^3$—68 in vol. of 3 m$^3$/m. At the second stage, the acidic (hydrochloric acid) composition was injected, % vol.: 30%-hydrochloric acid—50, diethylene glycol—6, acetic acid—2, corrosion inhibitor Sinol IK-001 (technical data sheet 2458-031-52412574-02)—1.5, water with a density of 1000 kg/m$^3$—40.5 in vol. of 2 m$^3$/m. At the third stage, a highly stable direct emulsion with the content of colloidal solution of silicon dioxide nanoparticles was injected, % vol.: diesel fuel—17, emulsifier Sinol EMI (technical data sheet 2484-007-52412574-01)—2, colloidal solution of silicon dioxide nanoparticles (silicon dioxide—31% vol., propylene glycol monomethyl ether—68.7% vol., water—0.3% vol.)—1, technical water with a concentration of potassium chloride 30 kg/m$^3$—80, in the vol. 5.2 m$^3$/m with subsequent squeezing down to the formation by liquid of reservoir pressure maintenance system.

After 8 months, the efficiency of the treatment was evaluated. Additional oil production from the reacting production wells amounted to 1.04 thousand tons per well. At the time of assessment, the effect continued.

Example 4

Treatment of an injection well in carbonate formation. The injectivity (capacity) before treatment is 390 m$^3$/day. The thickness of the perforated interval to be treated is 41 m.

An arrangement and binding of the equipment according to the typical scheme were made. The injection of working fluids was carried out in three succeeding stages. The etching time did not provide.

At the first stage, the invert-emulsion of the following composition was injected, % vol.: diesel fuel—35, emulsifier Sinol EMI (technical data sheet 2484-007-52412574-01)—3, an aqueous solution of calcium chloride with a concentration of 30 kg/m$^3$—62 in vol. 5 m$^3$/m. At the second stage, the acidic (hydrochloric acid) composition was injected, % vol.: 30%-hydrochloric acid—60, diethylene glycol—10, acetic acid—3, corrosion inhibitor Sinol IK-001 (technical data sheet 2458-031-52412574-02)—2, water with a density of 1000 kg/m$^3$—25 in vol. 2.5 m$^3$/m. At the third stage, a highly stable direct emulsion with the content of colloidal solution of silicon dioxide nanoparticles was injected, % vol.: diesel fuel—20, emulsifier Sinol EMI (technical data sheet 2484-007-52412574-01)—2.5, colloidal solution of silicon dioxide nanoparticles (silicon dioxide—31% vol., propylene glycol monomethyl ether—68.7% vol., water—0.3% vol.)—1.5, technical water with a concentration of potassium chloride 30 kg/m$^3$—76, in the vol. 6.2 m$^3$/m with subsequent squeezing down to the formation by liquid of reservoir pressure maintenance system.

After 8 months, the efficiency of the treatment was evaluated. Additional oil production from the reacting production wells amounted to 1.58 thousand tons per well. At the time of assessment, the effect continued.

Example 5

Treatment of an injection well in terrigenous formation. The injectivity (capacity) before treatment is 177 m$^3$/day. The thickness of the perforated interval to be treated is 33 m.

An arrangement and binding of the equipment according to the typical scheme were made. The injection of working fluids was carried out in three succeeding stages. The etching time did not provide.

At the first stage, the invert-emulsion of the following composition was injected, % vol.: diesel fuel—32, emulsifier Sinol EMI (technical data sheet 2484-007-52412574-01)—3, an aqueous solution of calcium chloride with a concentration of 17 kg/m$^3$—65 in vol. 3 m$^3$/m. At the second stage, the acidic (hydrofluoric acid) composition was injected, % vol.: 30%-hydrochloric acid—48, fluorhydric acid—2, diethylene glycol—6, acetic acid—1.5, corrosion inhibitor Sinol IK-001 (technical data sheet 2458-031-52412574-02)—1.5, water with a density of 1000 kg/m$^3$—41 in vol. 2.4 m$^3$/m. At the third stage, a highly stable direct emulsion with the content of colloidal solution of silicon dioxide nanoparticles was injected, % vol.: diesel fuel—20, emulsifier Sinol EMI (technical data sheet 2484-007-52412574-01)—2.5, colloidal solution of silicon dioxide nanoparticles (silicon dioxide—30% vol. in isopropanol—68.5% vol and methyl alcohol—1.5% vol)—1.5, technical water with a concentration of potassium chloride 17 kg/m$^3$—76, in the vol. 3 m$^3$/m with subsequent squeezing down to the formation by liquid of reservoir pressure maintenance system.

After 8 months, the efficiency of the treatment was evaluated. Additional oil production from the reacting production wells amounted to 0.92 thousand tons per well. At the time of assessment, the effect continued.

Example 6

Treatment of an injection well in terrigenous formation. The injectivity (capacity) before treatment is 240 m$^3$/day. The thickness of the perforated interval to be treated is 58 m.

An arrangement and binding of the equipment according to the typical scheme were made. The injection of working fluids was carried out in three succeeding stages. The etching time did not provide.

At the first stage, the invert-emulsion of the following composition was injected, % vol.: oil from oil preparation and pumping station—35, emulsifier Sinol EMI (technical data sheet 2484-007-52412574-01)—3, an aqueous solution of calcium chloride with a concentration of 17 kg/m$^3$—62 in vol. 3.9 m$^3$/m. At the second stage, the acidic (hydrofluoric acid) composition was injected, % vol.: 30%-hydrochloric acid—48, fluorhydric acid—2, diethylene glycol—6, acetic acid—1.5, corrosion inhibitor Sinol IK-001 (technical data sheet 2458-031-52412574-02)—1.5, water with a density of 1000 kg/m$^3$—41 in vol. 2.8 m$^3$/m. At the third stage, a highly stable direct emulsion with the content of colloidal solution of silicon dioxide nanoparticles was injected, % vol.: oil from oil preparation and pumping station—17, emulsifier Sinol EMI (technical data sheet 248415 007-52412574-01)—2.2, colloidal solution of silicon dioxide nanoparticles (silicon dioxide—31% vol. in ethylene glycol—69% vol.)—1.5, technical water with a concentration of calcium chloride 17 kg/m$^3$—79.3, in the vol. 4.2 m$^3$/m with subsequent squeezing down to the formation by liquid of reservoir pressure maintenance system.

After 8 months, the efficiency of the treatment was evaluated. Additional oil production from the reacting production wells amounted to 1.22 thousand tons per well. At the time of assessment, the effect continued.

Example 7

Treatment of an injection well in terrigenous formation. The injectivity (capacity) before treatment is 182 m$^3$/day. The thickness of the perforated interval to be treated is 36 m.

An arrangement and binding of the equipment according to the typical scheme were made. The injection of working fluids was carried out in three succeeding stages. The etching time did not provide.

At the first stage, the invert-emulsion of the following composition was injected, % vol.: oil from oil preparation and pumping station—28, emulsifier Sinol EM (technical data sheet 2413-048-48482528-98)—2.5, an aqueous solution of calcium chloride with a concentration of 20 kg/m$^3$—69.5 in vol. 3.2 m$^3$/m. At the second stage, the acidic (hydrofluoric acid) composition was injected, % vol.: 30%-hydrochloric acid—48, fluorhydric acid—2, diethylene glycol—6, acetic acid—1.5, corrosion inhibitor Sinol IKK (technical data sheet 2484-002-48482528-98)—1.5, water with a density of 1000 kg/m$^3$—41 in vol. 2.5 m$^3$/m. At the third stage, a highly stable direct emulsion with the content of colloidal solution of silicon dioxide nanoparticles was injected, % vol.: oil from oil preparation and pumping station—10, emulsifier Sinol EM (technical data sheet 2413-048-48482528-98)—1, colloidal solution of silicon dioxide nanoparticles (silicon dioxide—31% vol. in ethylene glycol—69% vol.)—0.7, technical water with a concentration of calcium chloride 20 kg/m$^3$—89.3, in the vol. 3 m$^3$/m with subsequent squeezing down to the formation by liquid of reservoir pressure maintenance system.

After 8 months, the efficiency of the treatment was evaluated. Additional oil production from the reacting production wells amounted to 0.94 thousand tons per well. At the time of assessment, the effect continued.

Example 8

Treatment of the group of injection wells in terrigenous formation. The injection of process fluids through the CPS. The main technological parameters of the wells and the injection volumes are shown in FIG. 8.

An arrangement and binding of the equipment according to the typical scheme were made. The injection of working fluids was carried out in three succeeding stages. The etching time did not provide.

At the first stage, the invert-emulsion of the following composition was injected, % vol.: oil from oil preparation and pumping station—25, emulsifier Sinol EM (technical data sheet 2413-048-48482528-98)—2.5, an aqueous solution of calcium chloride with a concentration of 15 kg/m$^3$—72.5 in vol. 4.05 m$^3$/m (average for 12 wells). The total volume of the invert-emulsion for 12 wells was 1689.5 m$^3$. At the second stage, the Neonol BS-1 (technical data sheet 2483-005-48482528-99) in volume 2.28 m$^3$/m (average for 12 wells) was injected. The total volume of Neonol BS-1 for 12 wells was 951.1 m$^3$. At the third stage, the highly stable direct emulsion with the content of colloidal solution of silicon dioxide nanoparticles was injected, % vol.: oil from oil preparation and pumping station—20, emulsifier Sinol EM (technical data sheet 2413-048-48482528-98)—2.5, colloidal solution of silicon dioxide nanoparticles (silicon dioxide—30% vol. in isopropanol—68.5% vol and methyl alcohol—1.5% vol.)—1.5, technical water with a concentration of calcium chloride 15 kg/m$^3$—76, in the vol. 4.97 m$^3$/m (average for 12 wells) with subsequent squeezing down to the formation by liquid of reservoir pressure maintenance system. The total volume of the highly stable emulsion for 12 wells was 2078.2 m$^3$.

The lines of the pump units were disconnected. After that the CPS continued its work in accordance with the established technological mode of operation.

After 8 months, the efficiency of the treatment was evaluated. Additional oil production from the reacting production wells amounted to 12.6 thousand tons. At the time of assessment, the effect continued.

Thus, the invention makes it possible to enhance the oil recovery factor and increase the efficiency of development of oil and gas fields due to:
  increase in the coverage of reservoir with the treatment;
  alignment of the front of oil displacement;
  changes in the marginal angle of selective wetting of rocks;
  selectively blocking the most permeable intervals of the layers;
  increase in filtration characteristics of less permeable intervals and washing the film of oil;
  the use of emulsion systems that do not contain substances that form insoluble precipitation.

The invention claimed is:

1. A method for increasing oil recovery from an oil-bearing formation, comprising the following successive stages of treating the formation:
  injecting an invert-emulsion in a volume of 3-5 m$^3$/m of perforated interval thickness followed by squeezing down an acidic composition in a volume of 2-3 m$^3$/m of perforated interval thickness to the formation;
  injecting a highly stable direct emulsion containing silicon dioxide nanoparticles in a volume of 3-7 m$^3$/m of perforated interval thickness followed by squeezing down a liquid from a reservoir pressure maintenance system to the formation;
  wherein the invert-emulsion has the following composition, % vol.: a diesel fuel or a treated oil from an oil preparation and pumping station—25-35, emulsifier—1.5-3, a technical water—the rest;
  the acidic composition for carbonate formations has the following hydrochloric acid-based composition, % vol.: 30% hydrochloric acid—50-63, acetic acid—1-3, diethyleneglycol—6-12, a corrosion inhibitor—1.5-2, water—the rest;
  the acidic composition for terrigenous formations has the following hydrofluoric acid-based composition, % vol.: 30% hydrochloric acid—48-60, hydrofluoric acid—1-4, diethylene glycol—6-12, acetic acid—1-3, the corrosion inhibitor—1.5-2, water—the rest;
  the highly stable direct emulsion has the following composition, % vol: a diesel fuel or a treated oil from the oil preparation and pumping station—10-20, emulsifier—1-2.5, colloidal solution of silicon dioxide nanoparticles with a particle size from 9 to 100 nanometers—0.5-1.5, a technical water—the rest, wherein the technical water is a solution of calcium chloride or a solution of potassium chloride.

2. A method for increasing oil recovery from an oil-bearing formation, comprising the following successive stages of treating the formation:
  injecting an invert-emulsion in a volume of 3-5 m$^3$/m of perforated interval thickness followed by squeezing down a composition containing a nonionic surfactant to the formation in a volume of 2-3 m$^3$/m perforated interval thickness;
  injecting a highly stable direct emulsion containing silicon dioxide nanoparticles in a volume of 3-7 m$^3$/m perforated interval thickness, followed by squeezing down a liquid from a reservoir pressure maintenance system to the formation;
  wherein the invert-emulsion has the following composition, % vol.: a diesel fuel or a treated oil from an oil preparation and pumping station—25-35, emulsifier—1.5-3, a technical water—the rest;

the highly stable direct emulsion has the following composition, % vol: a diesel fuel or a treated oil from the oil preparation and pumping station—10-20, emulsifier—1-2.5 colloidal solution of silicon dioxide nanoparticles with a particle size from 9 to 100 nanometers—0.5-1.54, a technical water—the rest, wherein the technical water is a solution of calcium chloride or a solution of potassium chloride.

* * * * *